United States Patent [19]
Yamashita et al.

[11] Patent Number: 5,689,953
[45] Date of Patent: Nov. 25, 1997

[54] COOLING SYSTEM FOR A LIQUID-COOLED ENGINE

[75] Inventors: Nobuyuki Yamashita; Ryozo Imanishi; Masaki Hayashi; Kazuaki Kurohara; Masatake Murakawa; Katsuhiko Uemura; Eriya Harada, all of Sakai, Japan

[73] Assignee: Kubota Corporation, Japan

[21] Appl. No.: 623,561

[22] Filed: Mar. 28, 1996

[30] Foreign Application Priority Data

Mar. 29, 1995 [JP] Japan ........................ 7-71112
Sep. 6, 1995 [JP] Japan ........................ 7-228755
Sep. 6, 1995 [JP] Japan ........................ 7-228756

[51] Int. Cl.$^6$ ........................ F01P 1/00; F01P 1/08; F01N 3/02
[52] U.S. Cl. ........................ 60/316; 60/320; 123/41.56; 123/41.7; 123/41.49; 180/68.1
[58] Field of Search ........................ 60/316, 320; 123/198 E, 123/195 C, 41.56, 41.7, 41.49; 180/68.1

[56] References Cited

U.S. PATENT DOCUMENTS

| | | | |
|---|---|---|---|
| 2,121,319 | 6/1938 | Fluor, Jr. et al. | 60/320 |
| 3,949,726 | 4/1976 | List | 123/198 E |
| 4,265,332 | 5/1981 | Presnall et al. | 181/211 |
| 4,706,615 | 11/1987 | Scadding | 123/41.01 |
| 4,766,983 | 8/1988 | Tamba | 181/240 |
| 4,862,981 | 9/1989 | Fujikawa | 180/68.4 |
| 4,891,940 | 1/1990 | Tamba | 60/320 |
| 4,903,485 | 2/1990 | Tamba et al. | 60/320 |
| 5,029,668 | 7/1991 | Murakawa | 181/240 |
| 5,036,931 | 8/1991 | Iritani | 180/68.1 |
| 5,086,858 | 2/1992 | Mizuta et al. | 123/41.56 |
| 5,113,819 | 5/1992 | Murakawa | 123/198 |
| 5,174,406 | 12/1992 | Lee | 180/68.1 |
| 5,199,521 | 4/1993 | Samejima et al. | 180/68.1 |
| 5,207,187 | 5/1993 | Kurohara et al. | 124/41.7 |
| 5,284,115 | 2/1994 | Imanishi | 123/41.7 |

*Primary Examiner*—Ira S. Lazarus
*Assistant Examiner*—Nhat-Hang H. Lam
*Attorney, Agent, or Firm*—Webb Ziesenheim Bruening Logsdon Orkin & Hanson, P.C.

[57] ABSTRACT

A cooling system for a vehicle having a radiator disposed above an engine, and a muffler disposed in a region below the engine. This system includes an air intake guide for guiding cooling air to the radiator from outside, an exhaust guide for guiding a large part of the cooling air having flowed past the radiator, forwardly of the vehicle, a cooling fan for producing air currents flowing from the air intake guide past the radiator to the exhaust guide, and ducts provided for opposite sides of the exhaust guide for guiding part of the cooling air having flowed passed the radiator into a muffler cover enclosing the muffler. The ducts communicate with positions of the muffler cover to blow the cooling air toward connections between exhaust pipes of the engine and the muffler.

20 Claims, 4 Drawing Sheets

COOLING SYSTEM FOR A LIQUID-COOLED ENGINE

BACKGROUND OF THE INVENTION

1. Field of the Invention

The present invention relates to a cooling system for a liquid-cooled engine mounted on a vehicle as a vertical engine.

2. Description of the Related Art

As disclosed in U.S. Pat. No. 4,891,840, for example, a cooling system for a liquid-cooled engine as described above includes a duct extending from a cooling fan disposed rearwardly of a radiator to a muffler, whereby air taken in to cool the radiator is used also to cool the muffler. Specifically, the air delivered by the cooling fan flows through a curved air passage formed in a relatively narrow space between the engine and a hood, and out of the vehicle after directly colliding with the muffler. With this construction, the air delivered by the cooling fan is subjected to a relatively strong resistance. In order to cause a large quantity of air to flow past the radiator, the cooling fan must have an increased air impelling performance.

In order to lessen the resistance applied to the air delivered by the cooling fan, it is possible to cause the air to flow out of the vehicle through a duct extending straight forward from the cooling fan, as disclosed in U.S. Pat. No. 4,766,983, for example. In this case, however, the muffler cannot be exposed to the air currents produced by the cooling fan. In order to cool the muffler efficiently, it is necessary to devise a construction to suspend the muffler in a lower forward position of the vehicle, for example, so that air currents act directly on the muffler during a run.

In the case of a vehicle having a liquid-cooled engine with a radiator, the larger quantity of air the cooling fan causes to flow through the radiator, the more effectively the radiator is cooled. Therefore, in order to extend the use of air to cooling of the muffler, it is important to form such an air passage from the cooling fan to the muffler as to impose little or no burden on the cooling fan.

SUMMARY OF THE INVENTION

The object of the present invention is to provide a cooling system in which cooling air currents delivered by a cooling fan through a radiator are used also in forcibly cooling a muffler without significantly affecting the air currents.

The above object is fulfilled, according to the present invention, by a cooling system for a vehicle having a radiator disposed above an engine, and a muffler disposed in a region below the engine, comprising:

an air intake guide for guiding cooling air to the radiator from outside;

an exhaust guide for guiding a large part of the cooling air having flowed past the radiator, forwardly of the vehicle;

a cooling fan for producing air currents flowing from the air intake guide past the radiator to the exhaust guide; and guide means provided for at least one side of the exhaust guide for guiding part of the cooling air having flowed passed the radiator to the muffler.

A quantity of air discharged forwardly and a quantity of air directed to the muffler may be appropriately selected by the exhaust guide for guiding a large part of the cooling air having flowed past the radiator, forwardly of the vehicle and the guide means for guiding part of the cooling air having flowed passed the radiator to the muffler.

In a preferred embodiment of the invention, the guide means includes a muffler cover substantially covering the muffler, and ducts extending between the muffler cover and the exhaust guide. The ducts forming the guide means are capable of transmitting the cooling air to desired positions of the muffler reliably and without substantial loss. Thus, a small quantity of air may be allocated to the ducts. As a result, a large part of air currents produced by the cooling fan flows to the exhaust guide, thereby entailing only a negligible resistance to exhaust flows.

The cooling air should desirably be directed to connections between exhaust pipes and the muffler. It is therefore preferable that the ducts open adjacent the connections between the exhaust pipes of the engine and the muffler.

Where the exhaust gas is not sufficiently cooled by cooling of the muffler, it is proposed as a preferred embodiment of the invention that the muffler includes an exhaust opening and an exhaust pipe connected to each other with a gap therebetween, whereby air in the muffler cover is drawn into the exhaust pipe by ejector action. With this construction, the exhaust gas mixes with the cooling air delivered by the cooling fan, to be exhausted from the vehicle through the exhaust pipe at a sufficiently low temperature.

As a construction suited for allocating a large quantity of air delivered by the cooling fan to the exhaust guide, and the remaining small quantity of air to the guide means, the present invention proposed to place the exhaust guide directly forwardly of the cooling fan, and the guide means in opposite regions transversely of the exhaust guide. That is, a large, central part of air currents from the cooling fan is discharged forwardly of the vehicle, while small parts of the air currents in the opposite side regions are given to the muffler through the guide means or ducts. This construction includes two ducts. In the case of a two-cylinder engine having two exhaust pipes, each duct may have an opening opposed to a connection between each exhaust pipe and the muffler.

Where a carburetor is disposed forwardly of the engine, the exhaust guide may include a cooling air release directed toward the carburetor. This construction reliably protects the carburetor which is vulnerable to heat.

Other features and advantages of the present invention will be apparent from the description of the preferred embodiment taken with reference to the drawings.

DETAILED DESCRIPTION OF THE PREFERRED EMBODIMENT

Figure 1:
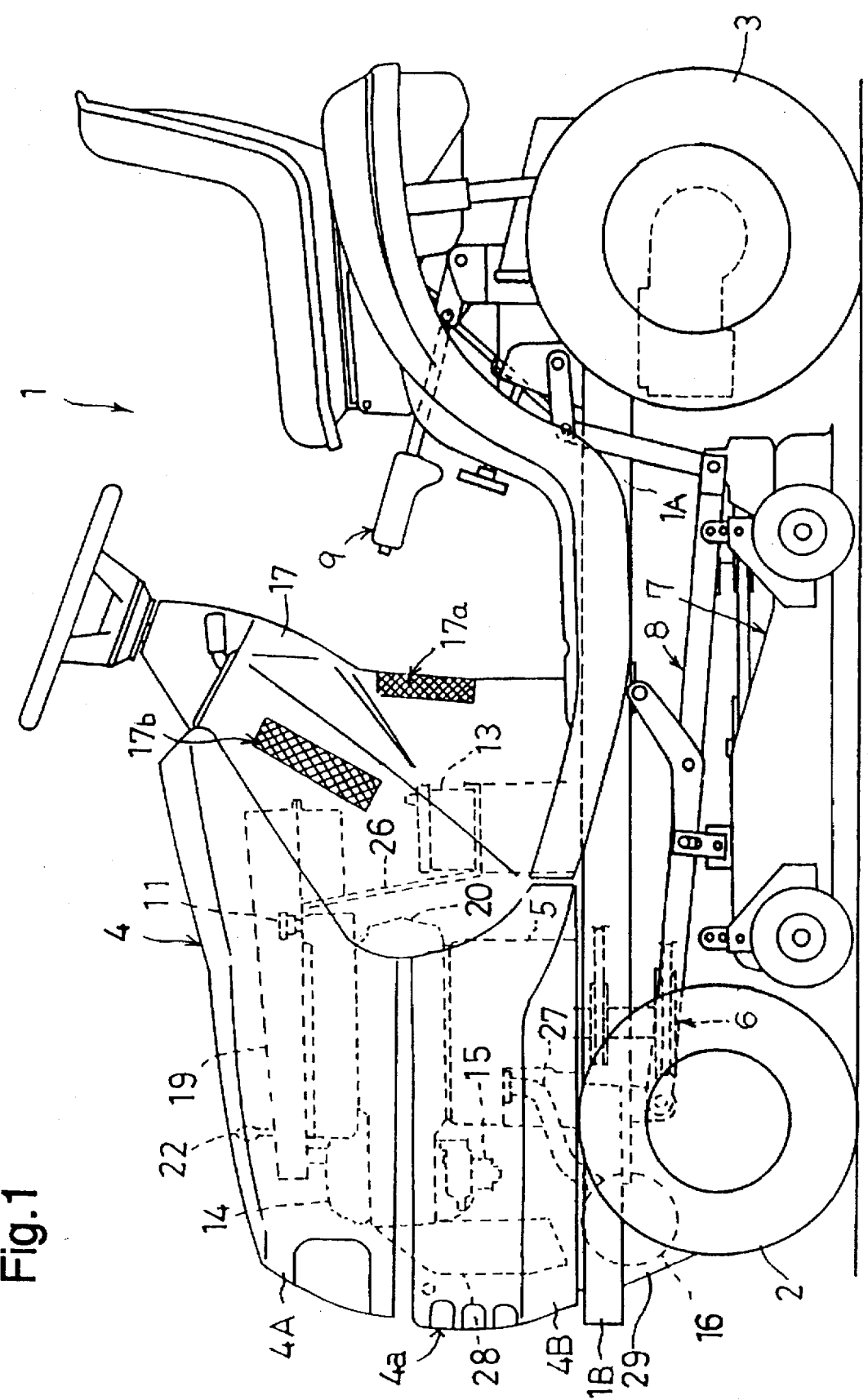
FIG. 1 is a side elevation of a riding lawn tractor employing a cooling system according to the present invention.

FIG. 1 shows a mid-mount type riding lawn tractor having a mower 7 suspended from a tractor body 1 between front and rear wheels 2 and 3. This riding lawn tractor includes an engine hood 4 disposed on a forward portion thereof and housing a vertical engine 5 with an output shaft extending downward. The engine 5 has an output pulley for transmitting drive through a belt transmission 6 to the mower 7. The mower 7 is vertically movably attached to body frames 1A through a link mechanism 8 raised and lowered by operating a hand lever 9.

Figure 2:
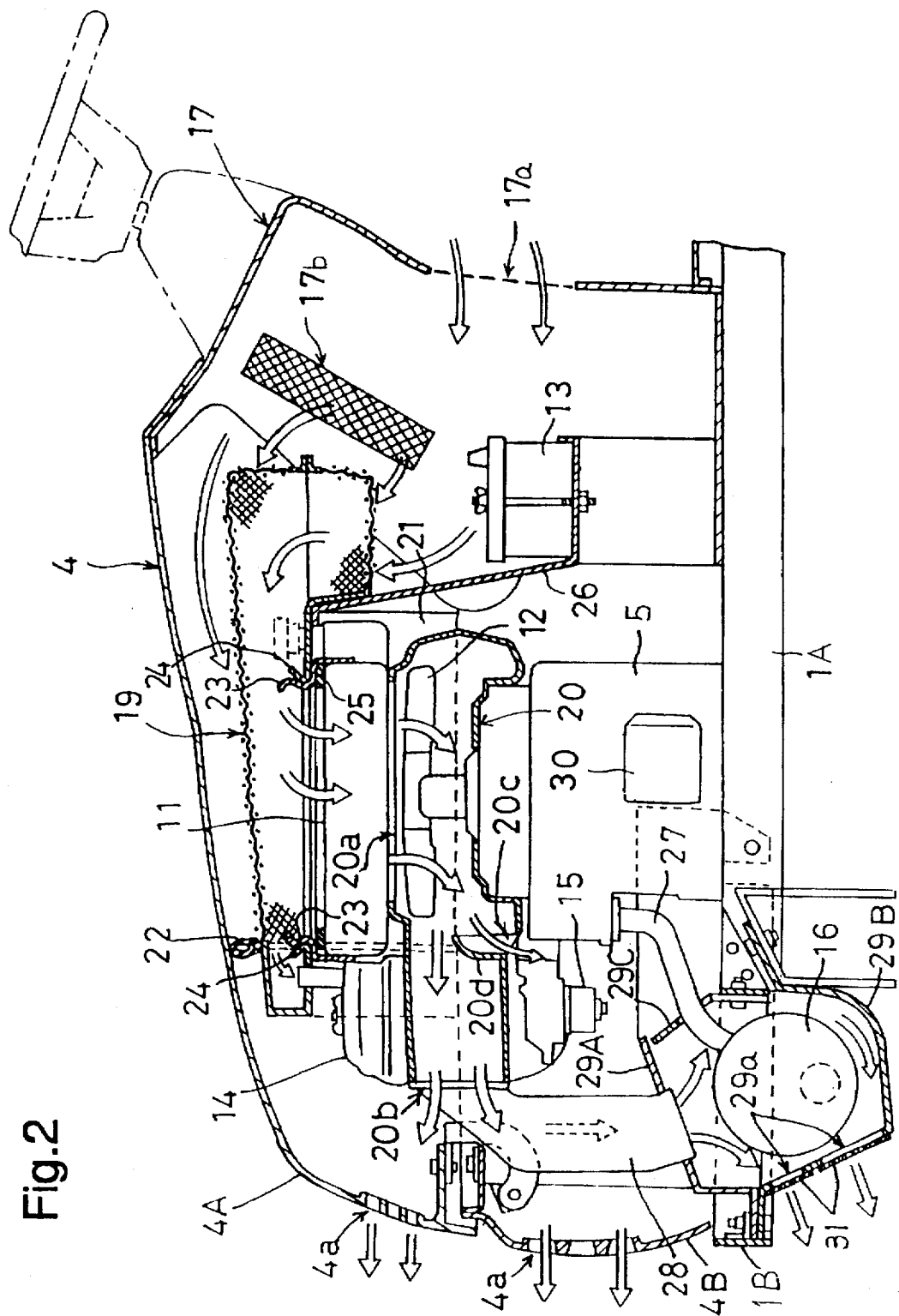
FIG. 2 is a side view in vertical section of a forward portion of the riding lawn tractor.

As shown in FIG. 2, the engine hood 4 houses the engine 5 which is water-cooled and has a horizontal radiator 11 and a radiator cooling fan 12 arranged in an upper position. A battery 13 is mounted rearwardly of the engine 5, while an air cleaner 14, a carburetor 15 and a muffler 16 are arranged forwardly of the engine 5. A box-shaped dust netting 19 is disposed above the radiator 11. A fan cover 20 extends forward from a space between the radiator 11 and engine 5. The fan cover 20 substantially covers the cooling fan 12 in combination with a lower surface of the radiator 11 and an upper surface of the engine 5, and acts as an exhaust guide for forwardly exhausting cooling air delivered from the cooling fan 12.

Figure 3:
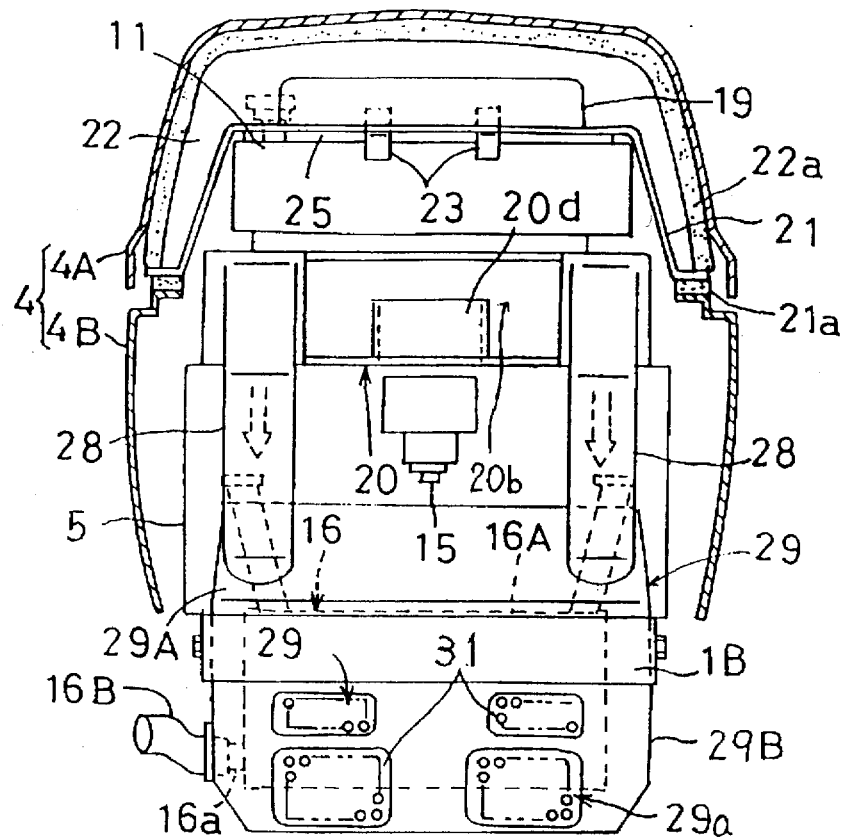
FIG. 3 is a front view in vertical section of the forward portion of the riding lawn tractor.
Figure 4:
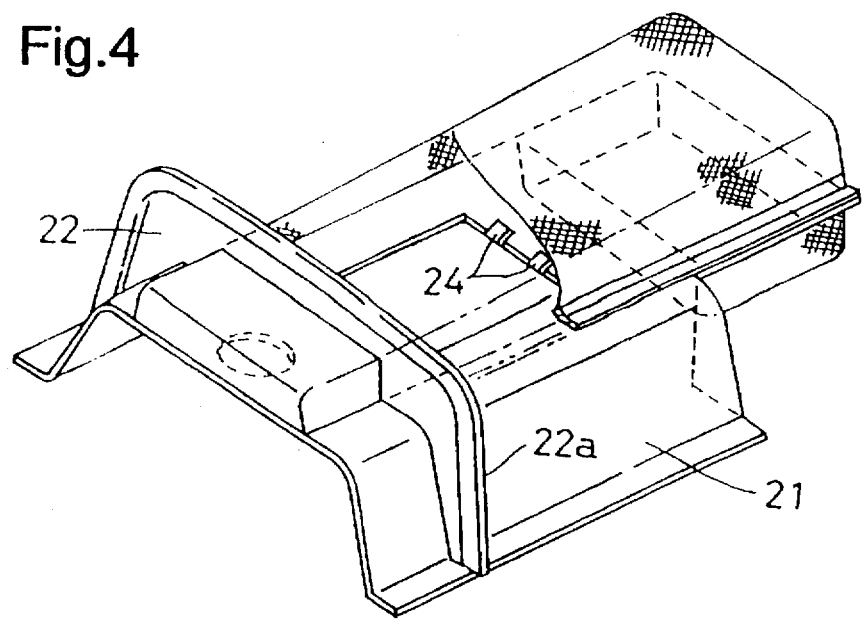
FIG. 4 is a perspective view of a dust netting.

As shown in FIGS. 2 through 4, a shield 21 is connected to a bottom of the dust netting 19 to cover side surfaces of the radiator 11 and fan cover 20. Further, a heat shielding plate 22 straddles, and is fixedly connected to, an upper forward surface of the dust netting 19. A shield 26 is provided between the engine 5 and battery 13 for guiding radiator cooling air drawn in through intake openings 17a and 17b formed in a rear grille and side grilles constituting a control panel 17, to a rear bulge of the dust netting 19. This shield 26, hood 4 and control panel 17 define an intake air guide for guiding the cooling air from outside to the radiator 11. Trims 21a and 22a acting as seals are secured to a lower end of the shield 21 and an outer periphery of the heat shielding plate 22, respectively. Further, cushion elements 25 are arranged between the bottom of the dust netting 19 and the upper surface of the radiator 11 for preventing entry of hot air and suppressing noise. The box-shaped dust netting 19 is connected to the radiator i 1 through elastic engaging pieces 23 formed of plate springs and arranged in front and rear and right and left positions of the radiator 11, and bent pieces 24 formed by bending edges of an opening in the bottom of the dust netting 19.

The fan cover 20 is a box-shaped cover defining an intake opening 20a in the upper surface, and an exhaust opening 20b in the front surface. The fan cover 20 also defines an exhaust opening 20c in the lower surface thereof. The lower surface includes a scoop 20d for allowing cooling air to flow at an appropriate rate out of the exhaust opening 20c.

As seen from FIG. 3, the engine 5 is a V-type 2-cylinder engine, and exhaust gases from combustion chambers in the respective cylinders are guided to the muffler 16 through exhaust pipes 27 arranged at opposite sides of the engine 5. Ducts 28 are provided at opposite sides of a forward portion of the fan cover 20, whereby the cooling air discharged from regions at opposite sides of the exhaust opening 20b in the front surface of the fan cover 20 is guided toward the muffler 16 and directed to connections between the muffler 16 and exhaust pipes 27.

Figure 5:
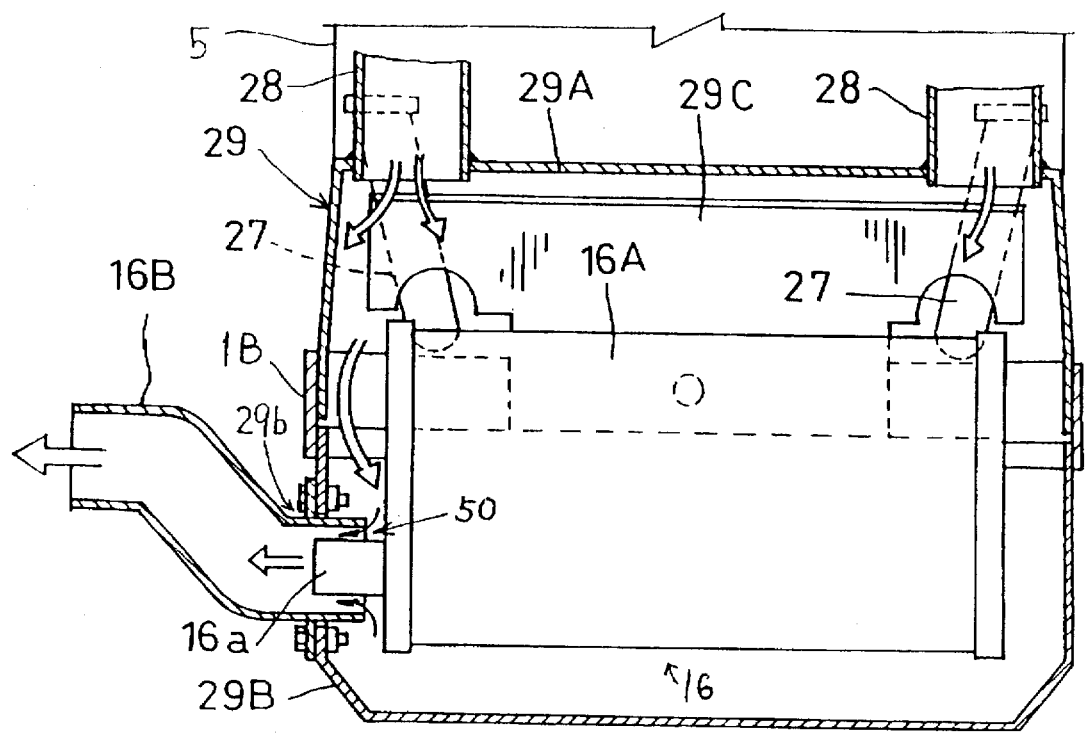
FIG. 5 is a front view in vertical section of a muffler and adjacent components.
Figure 6:
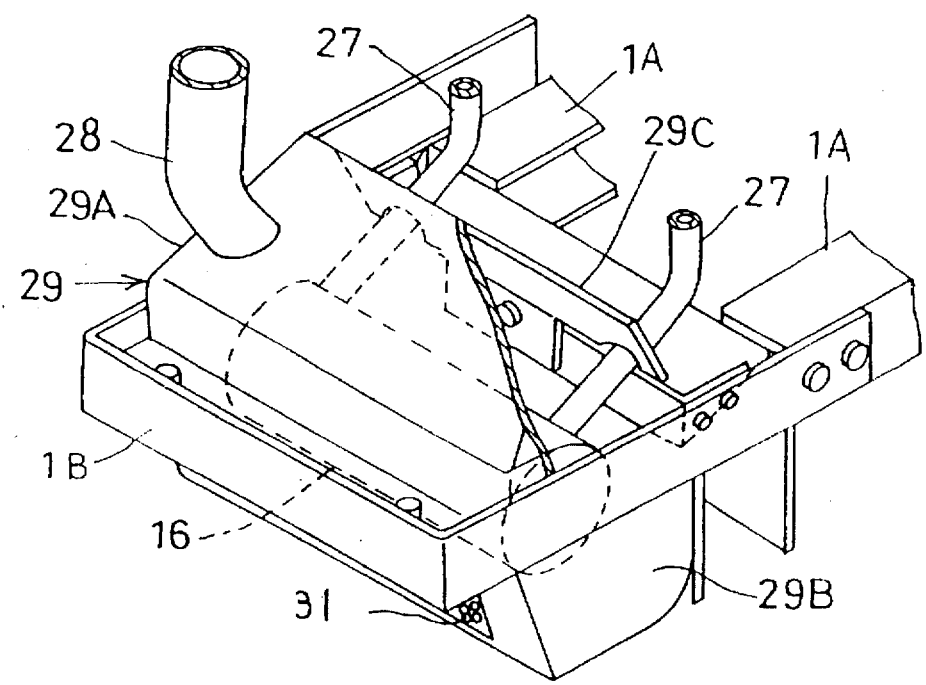
FIG. 6 is a perspective view of the muffler and adjacent components.

As will be understood from FIGS. 3, 5 and 6, the muffler 16 extends transversely of the tractor body inside a bumper frame 1B, U-shaped in plan view, interconnecting forward ends of right and left body frames 1A. The muffler 16 directs the exhaust gas laterally outwardly of the tractor body, and is covered by a muffler cover 29 formed of an upper cover 29A and a lower cover 29B fixed to the bumper frame 1B. The upper cover 29A has an upper surface and right and left side surfaces. The right and left side surfaces extend further rearward than the upper surface. The lower cover 29B has a lower surface and right and left side surfaces. The lower surface defines four exhaust openings 29a. The muffler 16 includes a muffler body 16A and an exhaust pipe 16B. The exhaust pipe 16B is attached to an exhaust opening 29b formed in a side surface of the lower cover 29B. The muffler body 16A has an outlet pipe 16a extending into the exhaust pipe 16B with a space 50 therebetween. The heat in the muffler cover 29 is released outside the tractor body by ejector action of exhaust gas flows. The exhaust pipe 16B is bent upward to direct the exhaust gas flows clear of dead leaves and the like collected on the ground. A rear muffler cover 29C is disposed rearwardly of the muffler body 16A and bolted to the bumper frame 1B to prevent the heat of the muffler 16 from being applied to an ignition coil 30 of the engine 5. The radiator cooling air having cooled the area adjacent the exhaust pipes 27 is thereby guided downward to flow out through the exhaust opening 29b. Perforated metal sheets 31 are provided for the exhaust openings 29a of the lower cover 29B to avoid a direct contact between dead leaves and the muffler body 16A.

According to the above construction, the cooling fan 12 draws cooling air through the intake openings 17a and 17b formed in the control panel 17 and gaps between an upper hood 4A and a lower hood 4B. The air stripped of dust by the dust netting 19 cools the radiator 11. Then, a large part of the cooling air flows downward and forward through the fan cover 20, and flows forward and out through exhaust openings 4a in the front surface of the hood 4. A small part of the cooling air is guided by the ducts 28 to flow to the muffler 16, and out through the exhaust openings 29a formed in the lower surface of the muffler cover 29B. The cooling air guided into the right and left ducts 28 is directed to the connections between the muffler 16 and exhaust pipes 27, thereby to cool efficiently the hottest regions including the connections between the muffler 16 and exhaust pipes 27. The cooling air passing through the openings 20c in the lower surface of the fan cover 20 flows past the carburetor 15, and reaches exposed portions of the exhaust pipes 27 and the upper cover 29A of the muffler cover 29. The cooling air entering the muffler cover 29 cools the muffler 16, and then flows out through the exhaust opening 29b of the lower cover 29B of the muffler cover 29.

The above embodiment has been described in relation to the muffler structure for the two-cylinder engine having two exhaust pipes. The invention is applicable also to a two-cylinder engine in which exhaust gases from respective cylinder chambers are transmitted through an exhaust manifold and a single exhaust pipe to a muffler. In this case, only one duct 28 may be adequate.

What is claimed is:

1. In a cooling system for a liquid-cooled engine mounted as a vertical engine on a vehicle, said improved cooling system comprising:

a radiator disposed above said engine;

a muffler disposed in a region below said engine;

an air intake guide for guiding cooling air to said radiator from outside;

an exhaust guide having an exhaust opening for guiding a large part of the cooling air having flowed past said radiator, forwardly of said vehicle;

a cooling fan coupled to said engine for producing air currents flowing from said air intake guide past said radiator to said exhaust guide; and guide means provided for at least one side of said exhaust guide opening for guiding part of the cooling air having flowed past said radiator to said muffler, and for guiding a remainder of the cooling air forwardly of said vehicle through said exhaust guide.

2. A cooling system as defined in claim 1, wherein said guide means includes a muffler cover substantially covering said muffler, and a plurality of ducts extending between said muffler cover and said exhaust guide opening.

3. A cooling system as defined in claim 2, wherein said ducts open adjacent connections between exhaust pipes of said engine and said muffler.

4. A cooling system as defined in claim 2, wherein said muffler includes an exhaust opening and an exhaust pipe connected to each other with a gap therebetween, whereby air in said muffler cover is drawn into the exhaust pipe by ejector action.

5. A cooling system as defined in claim 1, wherein said exhaust guide is disposed directly forwardly of said cooling fan, and said guide means includes a pair of spaced ducts arranged in opposite regions transversely of said exhaust guide opening, wherein a quantity of air discharged forwardly through said exhaust guide opening is far larger than a quantity of air transmitted to said muffler through said guide means.

6. A cooling system as defined in claim 1, wherein said exhaust guide includes a cooling air release directed toward a carburetor of said engine.

7. In a cooling system for a liquid-cooled engine mounted as a vertical engine on a vehicle, said improved cooling system comprising:

a radiator disposed above said engine;

a muffler disposed in a region below said engine;

an air intake guide for guiding cooling air to said radiator from outside;

an exhaust guide for guiding a large part of the cooling air having flowed past said radiator, forwardly of said vehicle, wherein said exhaust guide includes a cooling air release for directing a remaining part of the cooling air having flowed past said radiator toward a carburetor of said engine;

a cooling fan coupled to said engine for producing air currents flowing from said air intake guide past said radiator to said exhaust guide; and guide means provided for at least one side of said exhaust guide for guiding part of the cooling air having flowed past said radiator to said muffler.

8. A cooling system as defined in claim 7, wherein said exhaust guide is disposed directly forward of said cooling fan, and said guide means includes a pair of spaced ducts arranged on opposite sides of said exhaust guide wherein a quantity of air discharged forwardly through said exhaust guide is far larger than a quantity of air transmitted to said muffler through said guide means.

9. A cooling system as defined in claim 8, wherein said ducts open adjacent connections between exhaust pipes of said engine and said muffler.

10. A cooling system as defined in claim 7, wherein said guide means includes a muffler cover substantially covering said muffler and wherein said muffler includes an exhaust opening and an exhaust pipe connected to each other with a gap therebetween, whereby air in said muffler cover is drawn into the exhaust pipe by ejector action.

11. In a cooling system for a liquid-cooled engine mounted as a vertical engine on a vehicle, said improved cooling system comprising:

a radiator disposed above said engine;

a muffler disposed in a region below said engine;

an air intake guide for guiding cooling air to said radiator from outside;

an exhaust guide having an exhaust opening for guiding a large part of the cooling air having flowed past said radiator, forwardly of said vehicle to said exhaust opening;

a cooling fan coupled to said engine for producing air currents flowing from said air intake guide past said radiator to said exhaust guide; and a pair of guide ducts spaced from each other provided on opposite sides of said exhaust opening, each said guide duct guiding part of the cooling air having flowed past said radiator through said exhaust opening to said muffler, wherein said guide ducts are spaced from each other along said exhaust opening such that part of the cooling air having flowed past said radiator exhausts forwardly of said vehicle.

12. A cooling system as defined in claim 11, further including a muffler cover substantially covering said muffler, wherein said pair of guide ducts extend between said muffler cover and said exhaust opening of said exhaust guide.

13. A cooling system as defined in claim 12, wherein said ducts open adjacent connections between the exhaust pipes of said engine and said muffler.

14. A cooling system as defined in claim 12, wherein said muffler includes an exhaust opening and an exhaust pipe connected to each other with a gap therebetween, whereby air in said muffler cover is drawn into the exhaust pipe by ejector action.

15. A cooling system as defined in claim 11, wherein said exhaust guide includes a cooling air release directed toward a carburetor of said engine for directing part of the cooling air having flowed past said radiator toward said carburetor.

16. In a cooling system for a liquid-cooled engine mounted as a vertical engine on a vehicle, said improved cooling system comprising:

a radiator disposed above said engine;

a muffler disposed in a region below said engine, said muffler being substantially covered by a muffler cover;

an air intake guide for guiding cooling air to said radiator from outside;

a cooling fan operable by a drive from said engine for producing air currents flowing from said air intake guide past said radiator to said exhaust guide;

an exhaust guide disposed forwardly of said cooling fan in a running direction of the vehicle, said exhaust guide guiding a large part of the cooling air having flowed past said radiator and exhausting it through an exhaust opening; and at least one duct extending downward for guiding part of the cooling air toward said muffler after the cooling air has flowed past said radiator, said duct having an inlet opened to said exhaust opening in a region adjacent to a lateral side of said exhaust opening, and an outlet opened to said muffler cover.

17. A cooling system as defined in claim 16, wherein said outlet of said duct faces a connection between an exhaust pipe of said engine and said muffler.

18. A cooling system as defined in claim 16, wherein said muffler includes an exhaust opening and an exhaust pipe connected to each other with a gap therebetween, whereby air in said muffler cover is drawn into the exhaust pipe by ejector action.

19. A cooling system as defined in claim 16, wherein a quantity of air discharged forwardly through said exhaust guide is far greater than a quantity of air transmitted to said muffler through said duct.

20. A cooling system as defined in claim 16, wherein said exhaust guide includes a cooling air release directed toward a carburetor of said engine for directing part of the cooling air having flowed past said radiator toward said carburetor.

* * * * *